US011175970B2

(12) United States Patent
Liebherr

(10) Patent No.: US 11,175,970 B2
(45) Date of Patent: Nov. 16, 2021

(54) MESSAGING IN A MULTI-CLOUD COMPUTING ENVIRONMENT

(71) Applicant: SAP SE, Walldorf (DE)

(72) Inventor: Wolf Liebherr, Bruchsal (DE)

(73) Assignee: SAP SE, Walldorf (DE)

( * ) Notice: Subject to any disclaimer, the term of this patent is extended or adjusted under 35 U.S.C. 154(b) by 158 days.

(21) Appl. No.: 16/169,936

(22) Filed: Oct. 24, 2018

(65) Prior Publication Data

US 2020/0133748 A1   Apr. 30, 2020

(51) Int. Cl.
*G06F 9/54* (2006.01)

(52) U.S. Cl.
CPC .............. *G06F 9/546* (2013.01); *G06F 9/542* (2013.01); *G06F 2209/547* (2013.01); *G06F 2209/548* (2013.01)

(58) Field of Classification Search
CPC .... G06F 9/546; G06F 9/542; G06F 2209/548; G06F 2209/547; H04L 9/3247; H04L 51/066; H04L 67/10
See application file for complete search history.

(56) References Cited

U.S. PATENT DOCUMENTS

| | | | |
|---|---|---|---|
| 9,172,766 B2 | 10/2015 | Narasimhan et al. | |
| 9,652,743 B2 | 5/2017 | Zhu et al. | |
| 9,665,411 B2 | 5/2017 | McGrath et al. | |
| 9,712,388 B2 | 7/2017 | Mishra et al. | |
| 9,734,466 B2 | 8/2017 | Cvetkovic et al. | |
| 2012/0016973 A1 | 1/2012 | Haris et al. | |
| 2012/0102572 A1* | 4/2012 | Murakami | G06F 9/5061 726/28 |
| 2012/0271927 A1* | 10/2012 | Shakirzyanov | G06F 9/5061 709/220 |
| 2013/0238752 A1* | 9/2013 | Park | H04L 67/1097 709/217 |
| 2014/0164184 A1 | 6/2014 | Akolkar et al. | |
| 2014/0334471 A1* | 11/2014 | Chen | H04W 16/06 370/338 |
| 2015/0195128 A1 | 7/2015 | Kim et al. | |
| 2015/0263894 A1* | 9/2015 | Kasturi | G06F 9/4856 709/222 |
| 2017/0214737 A1* | 7/2017 | Agarwal | H04L 69/326 |
| 2017/0373860 A1 | 12/2017 | Kshirsagar et al. | |
| 2020/0059492 A1* | 2/2020 | Janakiraman | H04L 63/0263 |

* cited by examiner

*Primary Examiner* — Doon Y Chow
*Assistant Examiner* — Carina Yun
(74) *Attorney, Agent, or Firm* — Mintz Levin Cohn Ferris Glovsky and Popeo, P.C.

(57) ABSTRACT

A method for messaging in a hybrid multi-cloud computing environment may include receiving, from a multi-cloud controller, a message. The hybrid multi-cloud computing environment may include multiple cloud platforms hosted on private, on premise infrastructure as well as public, third-party infrastructure. The multi-cloud controller may send the message to control an operation of the cloud platform. In response to receiving the message from the multi-cloud controller, the message may be deposited in message queue. The cloud platform may send a request to retrieve data destined for the cloud platform. The message from the message queue may be sent to the cloud platform in response to the request. Related systems and articles of manufacture, including computer program products, are also provided.

8 Claims, 6 Drawing Sheets

MESSAGING IN A MULTI-CLOUD COMPUTING ENVIRONMENT

FIELD

The present disclosure generally relates to cloud computing and, more specifically, to messaging and configuration management in a multi-cloud computing environment.

BACKGROUND

In a cloud computing environment, multiple tenants may be served by a shared pool of computing resources including, for example, computer networks, servers, storage, applications, services, and/or the like. The cloud computing environment may have a multi-cloud architecture in which the shared pool of computing resources are hosted by several cloud providers. Moreover, the cloud computing environment may be a hybrid cloud computing environment that includes a mix of private cloud providers and public cloud providers.

SUMMARY

Methods, systems, and articles of manufacture, including computer program products, are provided for messaging in a multi-cloud computing environment. In some implementations of the current subject matter, there is provided a system. The system can include at least one data processor. The system can further include at least one memory storing instructions that result in operations when executed by the at least one data processor. The operations can include: receiving, from a multi-cloud controller in a multi-cloud computing environment, a first message, the multi-cloud computing environment including a first cloud platform, and the multi-cloud controller sending the first message to at least control an operation of the first cloud platform; in response to receiving the first message from the multi-cloud controller, depositing the first message in a first message queue; receiving, from the first cloud platform, a first request to retrieve data destined for the first cloud platform; and responding to the first request by at least sending, to the first cloud platform, the first message from the first message queue.

In some variations, one or more of the features disclosed herein including the following features can optionally be included in any feasible combination. The first message may be normalized prior to depositing the first message in the first message queue. The first message may be normalized to conform to a native message format of the first cloud platform.

In some variations, the first message may be further normalized to include a cryptographic signature. The cryptographic signature may be generated using a shared key held in a repository that is accessible to the multi-cloud controller and the first cloud platform.

In some variations, the first message may be received as part of a payload of a first Hypertext Transfer Protocol (HTTP) request from the multi-cloud controller. The first request from the first cloud platform may be a second Hypertext Transfer Protocol (HTTP) request.

In some variations, the multi-cloud computing environment may further include a second cloud platform. The multi-cloud controller may send a second message in order to control an operation of the second cloud platform.

In some variations, the first message queue may hold the data destined for the first cloud platform and data destined for the second cloud platform. The second message from the multi-cloud controller may be deposited in the first message queue for retrieval by the second cloud platform.

In some variations, the first message queue may hold the data destined for the first cloud platform and a second message queue may hold data destined for the second cloud platform. The first message may be deposited in the first message queue for retrieval by the first cloud platform while the second message may be deposited in the second message queue for retrieval by the second cloud platform.

In some variations, the multi-cloud computing environment may be a hybrid cloud computing environment in which the first cloud platform is a private cloud platform and the second cloud platform is a public cloud platform.

In some variations, a second message destined for the multi-cloud controller may be received from the first cloud platform. The second message may be deposited in the first message queue in response to receiving the second message. A second request to retrieve data destined for the multi-cloud controller may be received from the multi-cloud controller. The response to the second request may include sending, to the multi-cloud controller, the second message from the first message queue.

In some variations, the first message may be sent by the multi-cloud controller to the first cloud platform in response to a second message received from a second cloud platform. The first message and/or the second message may be a notification and/or a configuration management task.

In another aspect, there is provided a method for messaging in a multi-cloud computing environment. The method may include: receiving, from a multi-cloud controller in a multi-cloud computing environment, a first message, the multi-cloud computing environment including a first cloud platform, and the multi-cloud controller sending the first message to at least control an operation of the first cloud platform; in response to receiving the first message from the multi-cloud controller, depositing the first message in a first message queue; receiving, from the first cloud platform, a first request to retrieve data destined for the first cloud platform; and responding to the first request by at least sending, to the first cloud platform, the first message from the first message queue.

In some variations, one or more of the features disclosed herein including the following features can optionally be included in any feasible combination. The method may further include normalizing the first message prior to depositing the first message in the first message queue. The first message may be normalized to conform to a native message format of the first cloud platform.

In some variations, the first message may be further normalized to include a cryptographic signature. The cryptographic signature may be generated using a shared key held in a repository that is accessible to the multi-cloud controller and the first cloud platform.

In some variations, the multi-cloud computing environment may further include a second cloud platform. The multi-cloud controller may send a second message in order to control an operation of the second cloud platform.

In some variations, the first message queue may hold the data destined for the first cloud platform and data destined for the second cloud platform. The second message from the multi-cloud controller may be deposited in the first message queue for retrieval by the second cloud platform.

In some variations, the first message queue may hold the data destined for the first cloud platform and a second message queue may hold data destined for the second cloud platform. The first message may be deposited in the first message queue for retrieval by the first cloud platform while the second message may be deposited in the second message queue for retrieval by the second cloud platform.

In some variations, the multi-cloud computing environment may be a hybrid cloud computing environment in which the first cloud platform is a private cloud platform and the second cloud platform is a public cloud platform.

In some variations, the method may further include: receiving, from the first cloud platform, a second message destined for the multi-cloud controller; in response to receiving the second message, depositing the second message in the first message queue; receiving, from the multi-cloud controller, a second request to retrieve data destined for the multi-cloud controller; and responding to the second request by at least sending, to the multi-cloud controller, the second message from the first message queue.

In some variations, the first message may be sent by the multi-cloud controller to the first cloud platform in response to a second message received from a second cloud platform. The first message and/or the second message may be a notification and/or a configuration management task.

In another aspect, there is provided a computer program product that includes a non-transitory computer readable medium. The non-transitory computer readable medium may store instructions that cause operations when executed by at least one data processor. The operations may include: receiving, from a multi-cloud controller in a multi-cloud computing environment, a first message, the multi-cloud computing environment including a first cloud platform, and the multi-cloud controller sending the first message to at least control an operation of the first cloud platform; in response to receiving the first message from the multi-cloud controller, depositing the first message in a first message queue; receiving, from the first cloud platform, a first request to retrieve data destined for the first cloud platform; and responding to the first request by at least sending, to the first cloud platform, the first message from the first message queue.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to messaging in a multi-cloud computing environment, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
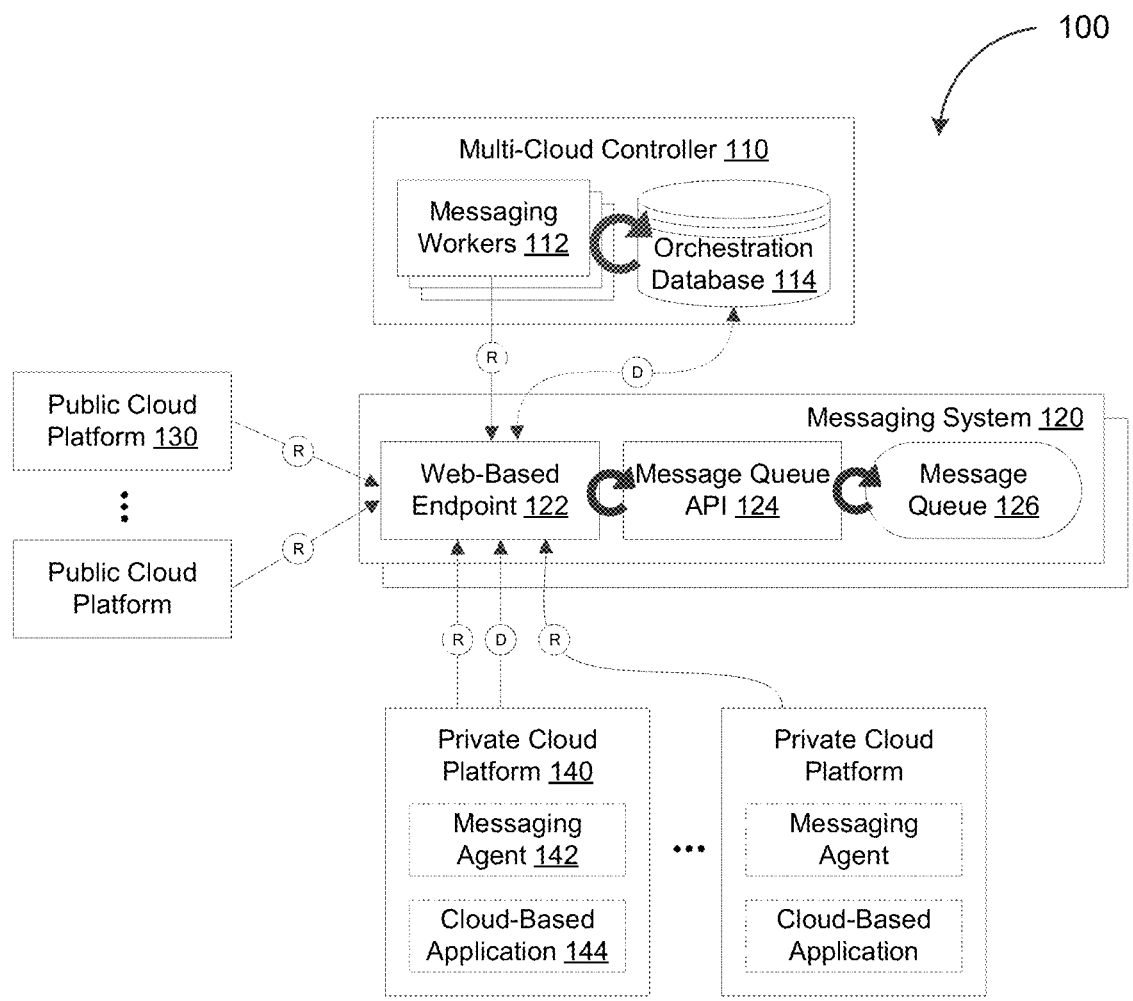
FIG. 1 depicts a system diagram illustrating a hybrid multi-cloud computing system, in accordance with some example embodiments.

Like labels are used to refer to same or similar items in the drawings.

DETAILED DESCRIPTION

A hybrid multi-cloud computing environment may include a shared pool of computing resources hosted by multiple cloud providers including, for example, private cloud providers, public cloud providers, and/or the like. As such, the hybrid multi-cloud computing environment may include a multitude of individual private cloud computing platforms deployed on premise cloud infrastructures as well as public cloud computing platforms deployed on third-party cloud infrastructures. The operations of the hybrid multi-cloud computing environment may require orchestration. For example, orchestration may be performed in order to configure each of the cloud computing platforms. Alternatively and/or additionally, orchestration may be performed in order to coordinate workflow and balance workload amongst the different cloud computing platforms. However, orchestrating a hybrid multi-cloud computing environment may engender a complex exchange of data amongst the different cloud computing platforms. Accordingly, in some example embodiments, a hybrid multi-cloud computing environment may include a messaging system configured to serve as a centralized data hub that brokers the exchange of data between the different cloud computing platforms.

FIG. 1 depicts a system diagram illustrating a hybrid multi-cloud computing system 100, in accordance with some example embodiments. Referring to FIG. 1, the hybrid multi-cloud computing system 100 may include a hybrid multi-cloud environment having multiple cloud-computing platforms hosted on private, on premise cloud infrastructures as well as public, third-party cloud infrastructures. For example, as shown in FIG. 1, the hybrid multi-cloud computing system 100 may include a public cloud platform 130 deployed on public, third-party cloud infrastructure. Alternatively and/or additionally, the hybrid multi-cloud computing system 100 may also include a private cloud platform 140 deployed on private, on premise cloud infrastructure. The public cloud platform 130 and the private cloud platform 140 may each provide a variety of services including, for example, software-as-a-service (SaaS), platform-as-a-service (PaaS), infrastructure-as-a-service (IaaS), and/or the like.

Referring again to FIG. 1, the hybrid multi-cloud computing system 100 may include a multi-cloud controller 110 configured to control the operations of the hybrid multi-cloud environment. For example, the multi-cloud controller 110 may perform orchestration in order to configure the public cloud platform 130 and/or the private cloud platform 140. Alternatively and/or additionally, the multi-cloud controller 110 may perform orchestration in order to coordinate workflow and/or balance workload amongst the public cloud platform 130 and/or the private cloud platform 140. Controlling the operations of the hybrid multi-cloud environment may require the exchange of data between the multi-cloud controller 110, the public cloud platform 130, and/or the private cloud platform 140. For example, each of the multi-cloud controller 110, the public cloud platform 130, and the private cloud platform 140 may be a data producer that outputs data such as, for example, notifications, configuration management tasks, and/or the like. Each of the multi-cloud controller 110, the public cloud platform 130, and/or the private cloud platform 140 may further be a data consumer ingesting data such as, for example, notifications, configuration management tasks, and/or the like.

In some example embodiments, the hybrid multi-cloud computing system 100 may include a messaging system 120 configured to broker the exchange of data between the data producers and the data consumers in the hybrid multi-cloud computing system 100 including, for example, the multi-cloud controller 110, the public cloud platform 130, and/or the private cloud platform 140. As shown in FIG. 1, the messaging system 120 may include a web-based endpoint 122, a message queue application programming (API) interface 124, and a message queue 126. Moreover, the hybrid multi-cloud computing system 100 may include multiple instances of the messaging system 120 in order to provide failover backup and/or increase an availability of the messaging system 120. For instance, an instance of the messaging system 120 may be deployed in each geographical region served by the hybrid multi-cloud computing system 100.

Instead of data being exchanged directly between the multi-cloud controller 110, the public cloud platform 130, and/or the private cloud platform 140, the data that is being exchanged between the multi-cloud controller 110, the public cloud platform 130, and/or the private cloud platform 140 may be send to the messaging system 120. For example, instead of the multi-cloud controller 110 sending configuration management tasks directly to the public cloud platform 130 and/or the private cloud platform 140, the multi-cloud controller 110 may send the one or more configuration management tasks to the messaging system 120 where the one or more configuration management tasks may be held in the message queue 126 before being retrieved by and/or distributed to the public cloud platform 130 and/or the private cloud platform 140. According to some example embodiments, data held in the message queue 126 may be cryptographically signed and/or encrypted using any cryptographic hash function such as, for example, secure hash algorithm (SHA), message digest (MD) algorithm, RACE Integrity Primitives Evaluation Message Digest (RIPEMD), Whirlpool, BLAKE, and/or the like.

The multi-cloud controller 110, the public cloud platform 130, and the private cloud platform 140 may communicate with the messaging system 120, for example, to send and/or retrieve data from the messaging system 120, through the web-based endpoint 122. In some example embodiments, the web-based endpoint 122 may be a Representational State Transfer (REST) based or a Simple Object Access Protocol (SOAP) based Hypertext Transfer Protocol (HTTP) endpoint. As such, the multi-cloud controller 110, the public cloud platform 130, and/or the private cloud platform 140 may send and/or retrieve data (e.g., configuration management tasks, notifications, and/or the like) from the messaging system 120 by at least sending, to the messaging system 120, Hypertext Transfer Protocol requests such as, for example, GET, POST, and/or the like. For instance, in the previous example, the multi-cloud controller 110 may send, to the messaging system 120, a Hypertext Transfer Protocol request (e.g., POST) in order to send, to the messaging system 120, the configuration management tasks destined for the public cloud platform 130 and/or the private cloud platform 140. Alternatively and/or additionally, the public cloud platform 130 and/or the private cloud platform 140 may send, to the messaging system 120, a Hypertext Transfer Protocol request (e.g., GET) in order to retrieve, from the messaging system 120, the configuration management tasks sent by the multi-cloud controller 110. It should be appreciated that the configuration management task may be included in the Hypertext Transfer Protocol request as part of a payload of the request. The payload of the request may be in JavaScript Object Notation (JSON) and/or a different format.

As noted, the multi-cloud controller 110, the public cloud platform 130, and the private cloud platform 140 may communicate with the messaging system 120 through the web-based endpoint 122. For example, the multi-cloud controller 110, the public cloud platform 130, and the private cloud platform 140 may communicate with the messaging system 120 in order to send and/or retrieve data that is held in the message queue 126 of the messaging system 120. In some example embodiments, the messaging system 120 may include a separate message queue for each data consumer in the hybrid multi-cloud computing system 100 such as, for example, the multi-cloud controller 110, the public cloud platform 130, and the private cloud platform 140. Alternatively, the messaging system 120 may include a single message queue for every data consumer in the hybrid multi-cloud computing system 100.

For example, the message queue 126 may hold data for a single data consumer such as, for example, the multi-cloud controller 110, the public cloud platform 130, or the private cloud platform 140. For instance, the message queue 126 may hold data destined for the public cloud platform 130 but not data destined for the multi-cloud controller 110 or for the private cloud platform 140, which may be held in separate message queues (not shown). Alternatively and/or additionally, the message queue 126 may hold data for multiple data consumers including, for example, data destined for the multi-cloud controller 110, the public cloud platform 130, and the private cloud platform 140.

Where the message queue 126 holds data destined for a single data consumer, one or more messaging workers 112 at the multi-cloud controller 110 may be configured to route data (e.g., configuration management tasks, notifications, and/or the like) to the appropriate message queue. Likewise, if the message queue 126 holds data destined for only a single data consumer, the public cloud platform 130 and the private cloud platform 140 may each be configured to route data destined for a specific data consumer to the appropriate message queue.

For example, if the message queue 126 holds data destined for the public cloud platform 130 but not data destined for the private cloud platform 140, the messaging workers 112 may route only the data that is destined for the public cloud platform 130 to the message queue 126. Meanwhile, the messaging workers 112 may route data that is destined for the private cloud platform 140 to a separate message queue (not shown) that holds data destined for the private cloud platform 140. Furthermore, in some example embodiments, the messaging workers 112 may normalize the data destined for the public cloud platform 130 in accordance with the native message format of the public cloud platform 130 prior to sending the data to the messaging system 120 to be deposited in the message queue 126 for subsequent retrieval by the public cloud platform 130. As such, the public cloud platform 130 may be able to directly ingest the data retrieved from the message queue 126, for example, using one or more Hypertext Transfer Protocol requests (e.g., GET) sent to the messaging system 120. It should be appreciated that a quantity of messaging workers 112 in the multi-cloud controller 110 may determine a rate at which data is normalized prior being sent to the messaging system 120. For example, having multiple messaging workers 112 at the multi-cloud controller 110 may increase the rate of normalization by at least enabling at least some of the data to be normalized in parallel.

Alternatively and/or additionally, where the message queue 126 holds data destined for multiple data consumers, the message queue application programming interface (API) 124 may be configured to normalize the data in accordance with the destination of the data. For example, prior to depositing data in the message queue 126, the message queue application programming interface 124 may normalize data destined for the public cloud platform 130 in accordance with the native message format of the public cloud platform 130 and data destined for the private cloud platform 140 in accordance with the native message format of the private cloud platform 140. In doing so, the multi-cloud controller 110, the public cloud platform 130, and the private cloud platform 140 may be able to directly ingest the data retrieved from the message queue 126, for example, using one or more Hypertext Transfer Protocol requests (e.g., GET) sent to the messaging system 120. Although various embodiments of the present subject matter is described with respect to the message queue application programming interface 124, it should be appreciated that at least some of functionalities of the message queue application programming interface 124 may be implemented as a custom wrapper containing additional logic (e.g., the programming code for performing the normalization and/or the like). This custom wrapper may further include programming code calling an application programming interface in order to interact with the message queue 126.

Referring again to FIG. 1, the public cloud platform 130 and the private cloud platform 140 may retrieve data from the message system 120, for example, the message queue 126, by querying the messaging system 120 periodically for data destined for the public cloud platform 130 and/or the private cloud platform 140. However, it should be appreciated that the message system 120 may also support a publish-subscribe paradigm, in which case the public cloud platform 130 and/or the private cloud platform 140 may be actively notified of available data and/or be pushed the data whenever data destined for the public cloud platform 130 and/or the private cloud platform 140 becomes available.

For example, as shown in FIG. 1, the private cloud platform 140 may include a messaging agent 142 configured to query the messaging system 120 for data that is destined for the private cloud platform 140. Because the private cloud platform 140 is deployed on private, on premise infrastructure, the messaging agent 142 may communicate with the messaging system 120 using anonymous and/or implicit credentials. For example, the encrypted nature of data exchanged between the messaging system 120 and the private cloud platform 140 may prevent the data from being intercepted and/or exploited in an unauthorized manner. As such, the encrypted nature of data exchanged between the messaging system 120 and the private cloud platform 140 may obviate the need to explicit authentication.

By contrast, the public cloud platform 130, which may be deployed on public, third-party infrastructure, may require authentication prior to communicating with the messaging system 120. For instance, the public cloud platform 130 may be authenticated using a cloud-infrastructure specific mechanism (e.g., Managed Service Identity and/or the like) prior to being able to query the messaging system 120 for data destined for the public cloud platform 130.

Figure 2:
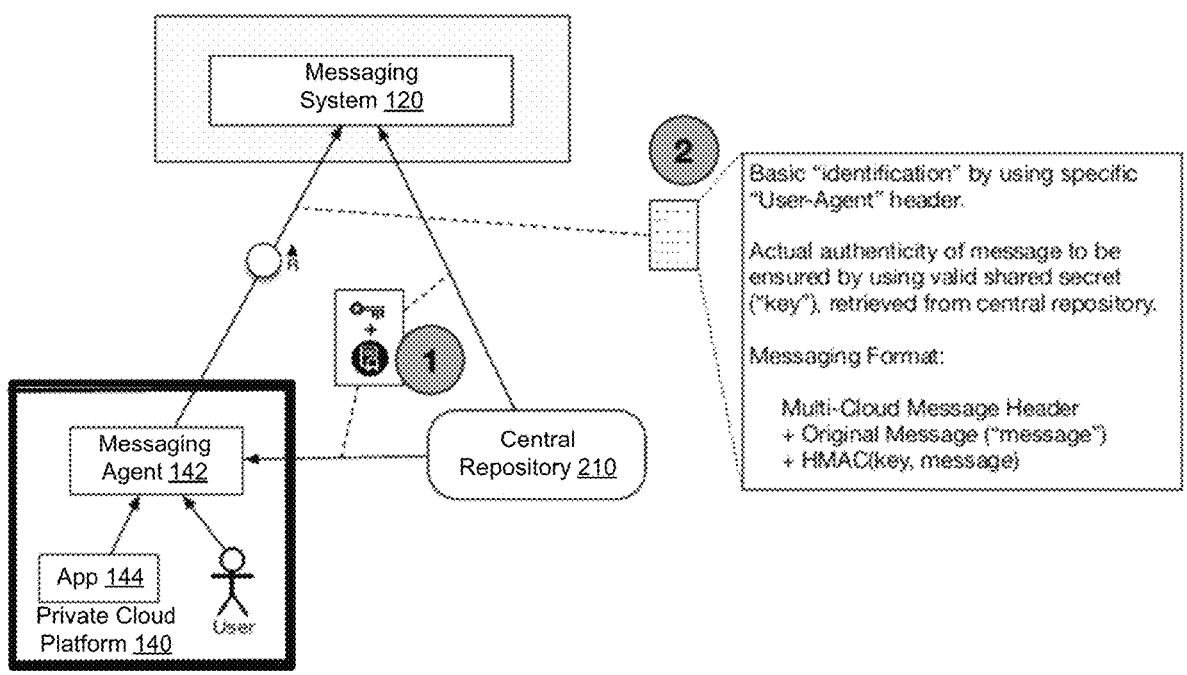
FIG. 2 depicts a system diagram illustrating a messaging system, in accordance with some example embodiments.

To further illustrate, FIG. 2 depicts a system diagram illustrating the messaging system 120, in accordance with some example embodiments. As shown in FIG. 2, the private cloud platform 140 may host a cloud-based application 144. The messaging agent 142 at the private cloud platform 140 may communicate with the messaging system 120, for example, by sending, to the messaging system 120, one or more Hypertext Transfer Protocol (HTTP) requests such as, for example, POST, GET, and/or the like. As noted, the messaging agent 142 may be able to communicate with the messaging system 120 using anonymous credentials due to the private cloud platform 140 being deployed on private, on premise infrastructure. Nevertheless, data that the private cloud platform 140 sends to the messaging system 120 may include, as part of a message header, an identity of the private cloud platform 140 and/or the messaging agent 142. Furthermore, as shown in FIG. 2, the data that the private cloud platform 140 sends to the messaging system 120 may include a cryptographic signature to ensure the authenticity of the data. For instance, the cryptographic signature may be a keyed-hash message authentication code (HMAC) that is generated using one or more shared keys held in a central repository 210 accessible to the private cloud platform 140 and the messaging system 120. It should be appreciated that different and/or additional authentication techniques (e.g., certificates and/or the like) may also be used to ensure the authenticity of the data that the private cloud platform 140 sends to the messaging system 120.

Figure 3:
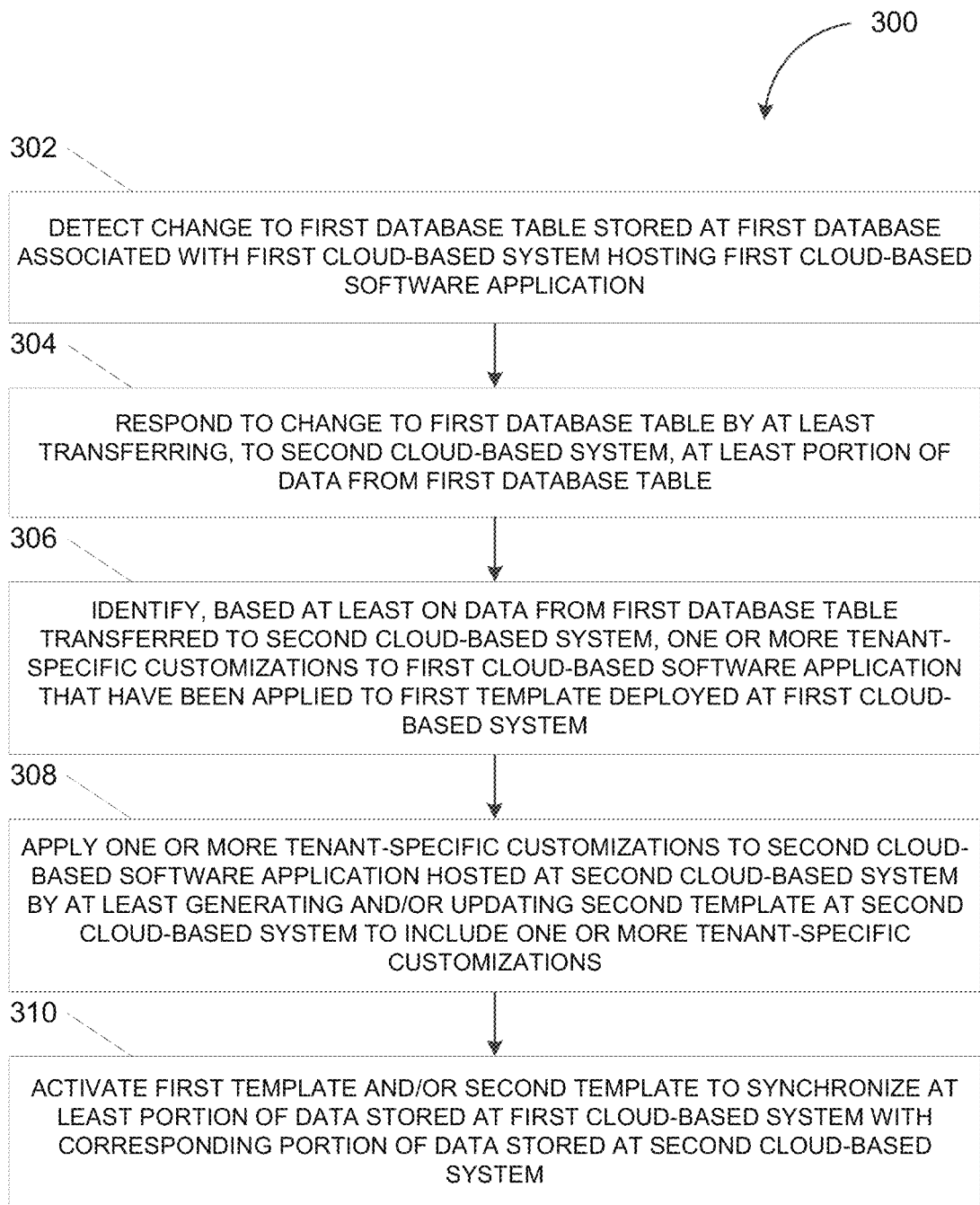
FIG. 3 depicts a flowchart illustrating a process for messaging in a multi-cloud computing environment, in accordance with some example embodiments.

FIG. 3 depicts a flowchart illustrating a process 300 for messaging in a multi-cloud computing environment, in accordance with some example embodiments. Referring to FIGS. 1-3, the process 300 may be performed by the messaging system 120 in order to broker the exchange of data within the hybrid multi-cloud computing system 100.

The messaging system 120 may receive, from a data producer in the hybrid multi-cloud computing system 100, a message destined for a data consumer in the hybrid multi-cloud computing system 100 (302). For example, the messaging system 120 may receive, from the multi-cloud controller 110 in the hybrid multi-cloud computing system 100, a configuration management task destined for the public cloud platform 130 and/or the private cloud platform 140.

Alternatively and/or additionally, the messaging system 120 may receive, from the public cloud platform 130 and/or the private cloud platform 140, a notification destined for the multi-cloud controller 110. In some example embodiments, the data producers in the hybrid multi-cloud computing system 120 may communicate with the messaging system 120 through the web-based endpoint 122. As noted, the web-based endpoint 122 may be a Representational State Transfer (REST) based or a Simple Object Access Protocol (SOAP) based Hypertext Transfer Protocol (HTTP) endpoint. Accordingly, the message may be sent to the messaging system 120 as part of a Hypertext Transfer Protocol request such as, for example, POST and/or the like. For example, the message may be sent to the messaging system 120 as part of the JavaScript Object Notation (JSON) payload of the Hypertext Transfer Protocol request.

The messaging system 120 may deposit the message in the message queue 126 (304). In some example embodiments, the messaging system 120 may include a separate message queue for each data consumer in the hybrid multi-cloud computing system 100. For example, the message queue 126 may be configured to hold data destined for the public cloud platform 130 but not data destined for the multi-cloud controller 110 or the private cloud platform 140. When the messaging system 120 includes a separate message queue for each data consumer in the hybrid multi-cloud computing system 100, the messaging system 120 may deposit the message in the message queue 126 based on the message being destined for the public cloud platform 130 associated with the message queue 126 and not the multi-cloud controller 110 or the private cloud platform 140. The message that is deposited into the message queue 126 may already be normalized, for example, by the messaging workers 112 at the multi-cloud controller 110, before being sent to the messaging system 120. For instance, the message that is deposited into the message queue 126 may be normalized to conform to the native message format of the public cloud platform 130 such that the message may be directly ingested by the public cloud platform 130.

Alternatively and/or additionally, the messaging system 120 may include a single message queue for every data consumer in the hybrid multi-cloud computing system 100. For example, the message queue 126 may be configured to hold data destined for the multi-cloud controller 110, the public cloud platform 130, and the private cloud platform 140. When the message queue 126 holds data destined for multiple data consumers, the message queue application programming interface (API) 124 may be configured to normalize the message prior to depositing the message in the message queue 126. For instance, if the message is destined for the public cloud platform 130, then the message queue application programing interface 124 may normalize the message to conform to the native message format of the public cloud platform 130. Alternatively and/or additionally, if the message is destined for the private cloud platform 140, then the message queue application programing interface 124 may normalize the message to conform to the native message format of the private cloud platform 140.

The messaging system 120 may receive, from the data consumer in the hybrid multi-cloud computing system 100, a request for data destined for the data consumer (306). In some example embodiments, a data consumer in the hybrid multi-cloud computing system 100 may query the messaging system 120 to determine, for example, whether the message queue 126 (or another message queue) contains data destined for that data consumer. As noted, communication with the messaging system 120 may be conducted through the web-based endpoint 122, which may be a Representational State Transfer (REST) based or a Simple Object Access Protocol (SOAP) based Hypertext Transfer Protocol (HTTP) endpoint. Accordingly, the messaging system 120 may receive a Hypertext Transfer Protocol request (e.g., GET) from one or more of the data consumers in the hybrid multi-cloud computing system 100 including, for example, the multi-cloud controller 110, the public cloud platform 130, and/or the private cloud platform 140. For example, the public cloud platform 130 may send, to the messaging system 120, a Hypertext Transfer Protocol request (e.g., GET) in order to retrieve, from the messaging system 120, one or more messages sent to the public cloud platform 130 from the multi-cloud controller 110 and/or the private cloud platform 140.

The messaging system 120 may respond to the request by at least sending, to the data consumer in the hybrid multi-cloud computing system 100, the message held in the message queue 126 (308). As noted, in some example embodiments, messaging system 120 configured to broker the exchange of data between the data producers and the data consumers in the hybrid multi-cloud computing system 100 including, for example, the multi-cloud controller 110, the public cloud platform 130, and/or the private cloud platform 140. As such, upon receiving the request from a data consumer in the hybrid-multi-cloud computing system 100, the messaging system 120 may respond by sending, to that data consumer, one or more of the messages held in the message queue 126 for that data consumer. For example, upon receiving the Hypertext Transfer Protocol request (e.g., GET) from the public cloud platform 130, the messaging system 120 may send, to the public cloud platform 130, one or more messages in the message queue 126 that are destined for the public cloud platform 130.

Figure 4A:
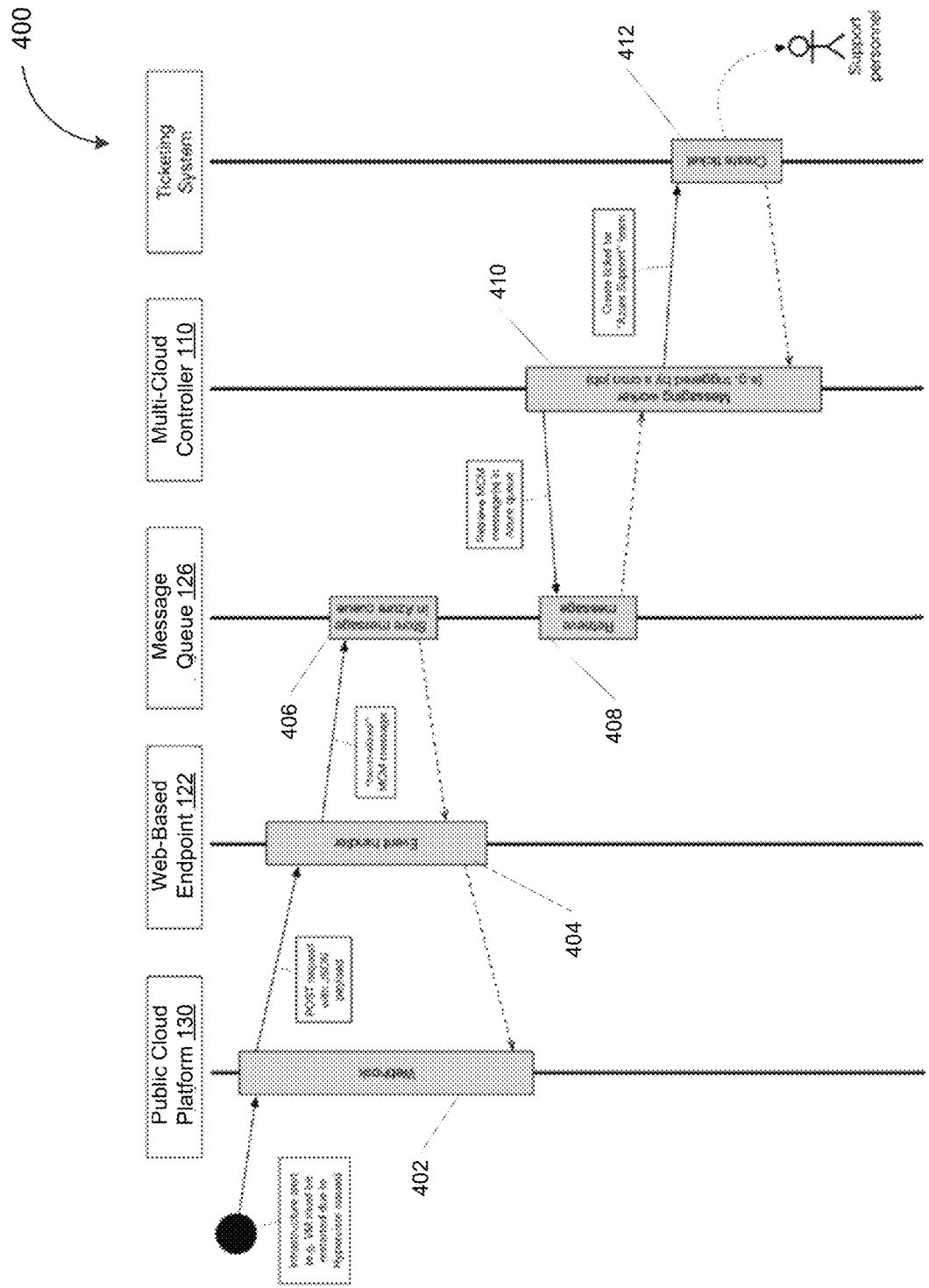
FIG. 4A depicts a sequence diagram illustrating a process for messaging in a multi-cloud computing environment, in accordance with some example embodiments.

FIG. 4A depicts a sequence diagram illustrating a process 400 for messaging in a multi-cloud computing environment, in accordance with some example embodiments. As shown in FIG. 4A, an infrastructure alert may trigger a web hook at the public cloud platform 130 (402). For example, the infrastructure alert may indicate that a virtual machine at the public cloud platform 130 may require a restart due to a fault at a corresponding hypervisor. Meanwhile, the web hook may respond to the infrastructure alert by generating a Hypertext Transfer Protocol request (e.g., POST) that includes, as part of its JavaScript Object Notation (JSON) payload, a notification that the virtual machine at the public cloud platform 130 may require a restart due to the fault at the corresponding hypervisor. The public cloud platform 130 may send, to the web-based endpoint 122 at the messaging system 120, the Hypertext Transfer Protocol request.

The web-based endpoint 122 may respond to the Hypertext Transfer Protocol request from the public cloud platform 130 by at least generating a validated and normalized message corresponding to the notification that form the JavaScript Object Notation payload of the Hypertext Transfer Protocol request (404). Moreover, the web-based endpoint 122 may deposit, in the message queue 126, the validated and normalized message (406). For example, prior to being deposited in the message queue 126, the web-based endpoint 122 may relay the Hypertext Transfer Protocol request to the message queue application programing interface (API) 124 at the messaging system 120 where the Hypertext Transfer Protocol request may be validated by the message queue application programing interface 124. Furthermore, the message queue application programming interface 124 may normalize the notification included in the JavaScript Object Notation payload of the Hypertext Transfer Protocol request. Alternatively and/or additionally, the message queue application programing interface 124 may ensure the authenticity of the message by at least adding, to the message, a cryptographic signature (e.g., a keyed-hash message authentication code (HMAC) and/or the like). It should be appreciated that the notification from the public cloud platform 130 may be destined for the multi-cloud controller 110. Accordingly, the message queue application programing interface 124 may normalize the notification to conform to a native message format of the multi-cloud controller 110 such that the notification may be ingested directly by the multi-cloud controller 110.

The multi-cloud controller 110 may retrieve the message from the message queue 126 (408). For example, the multi-cloud controller 110 may retrieve the message from the message queue 126 by at least sending, to the messaging system 120, a Hypertext Transfer Protocol request (e.g., GET). In some example embodiments, the multi-cloud controller 110 may retrieve the message when a periodic query of the messaging system 120 indicates that the message queue 126 includes one or more messages destined for the multi-cloud controller 110. Upon retrieving the message, the multi-cloud controller 110 may respond to the notification from the public cloud platform 130 by at least sending, to a ticketing system, a request to create a ticket for the fault at the hypervisor that precipitated the restart of the virtual machine at the public cloud platform 130 (410). Meanwhile, the ticketing system may create the ticket in response to the request from the multi-cloud controller 110 (412).

Figure 4B:
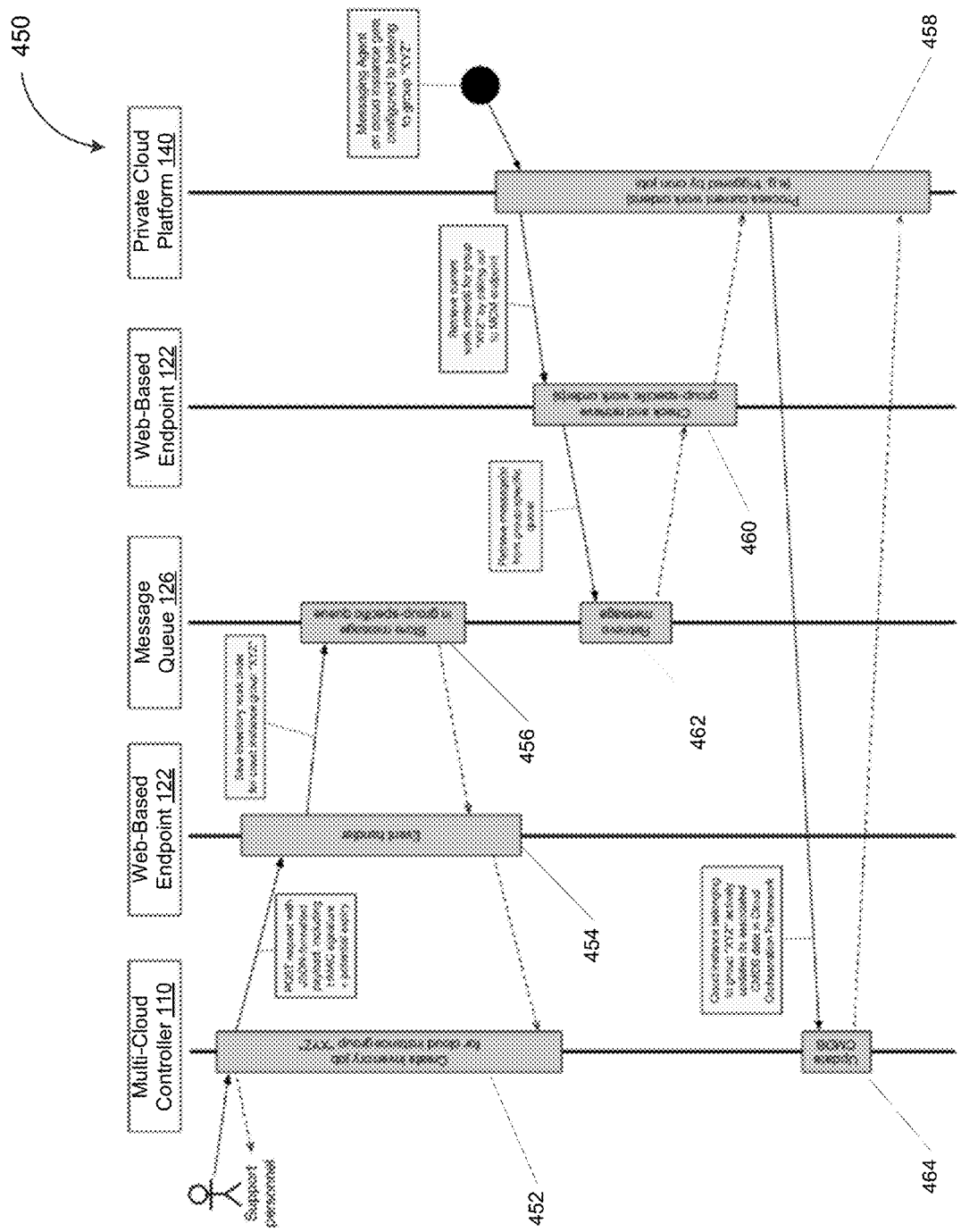
FIG. 4B depicts a sequence diagram illustrating a process for messaging in a multi-cloud computing environment, in accordance with some example embodiments.

FIG. 4B depicts a sequence diagram of a process 450 for messaging in a multi-cloud computing environment, in accordance with some example embodiments. As shown in FIG. 4B, the multi-cloud controller 110 may be configured to implement a configuration management task at one or more cloud platforms in the hybrid multi-cloud system 100 (452). For example, as shown in FIG. 4B, the configuration management task may include the creation of an inventory job for a cloud instance group "XYZ" that includes, for instance, the private cloud platform 140. Accordingly, the multi-cloud controller 110 may send, to the web-based endpoint 122 at the messaging system 120, a Hypertext Transfer Protocol (HTTP) request (e.g., POST). For instance, the configuration management task may be part of a JavaScript Object Notation (JSON) payload of the Hypertext Transfer Protocol request. The Hypertext Transfer Protocol request may further include a cryptographic signature (e.g., a keyed-hash message authentication code (HMAC) and/or the like) and, in some example embodiments, an expiration for the configuration management task.

The web-based endpoint 122 may respond to the Hypertext Transfer Protocol request from the multi-cloud controller 110 by at least generating a validated and normalized message corresponding to the configuration management task that forms the JavaScript Object Notation payload of the Hypertext Transfer Protocol request from the multi-cloud controller 110 (454). Moreover, the web-based endpoint 122 may deposit, in the message queue 126, the validated and normalized message (456). For example, prior to being deposited in the message queue 126, the web-based endpoint 122 may relay the Hypertext Transfer Protocol request to the message queue application programing interface (API) 124 at the messaging system 120 where the Hypertext Transfer Protocol request may be validated by the message queue application programing interface 124. Furthermore, the message queue application programming interface 124 may normalize the configuration management task included in the JavaScript Object Notation payload of the Hypertext Transfer Protocol request, for example, such that the configuration management task conforms to the native message format at the private cloud platform 140.

In some example embodiments, since the configuration management task includes the creation of the inventory job at a specific cloud instance group "XYZ" that includes the private cloud platform 140, the web-based endpoint 122 may deposit the validated and normalized message in the message queue 126 only if the message queue 126 is associated with private cloud platform 140 and/or another cloud platform that is part of the cloud instance group "XYZ."

The messaging agent 142 at the private cloud platform 140 may query the messaging system 120 for messages destined for the private cloud platform 140 (458). For example, the messaging agent 142 at the private cloud platform 140 may retrieve, from the message queue 126, messages destined for the private cloud platform 140 by at least sending, to the messaging system 120, a Hypertext Transfer Protocol request (e.g., GET). As shown in FIG. 4B, the messaging agent 142 at the private cloud platform 140 may be configured to recognize that the private cloud platform 140 is part of the cloud instance group "XYZ."

In some example embodiments, the private cloud platform 140 may retrieve the messages when a periodic query of the messaging system 120 indicates that the message queue 126 includes one or more messages destined for the private cloud platform 140. For instance, in this example, the message queue 126 may include one or more messages destined for the cloud instance group "XYZ," which may include the private cloud platform 140. These messages may include the configuration management task from the multi-cloud controller 110 to create an inventory job at the cloud instance group "XYZ."

The web-based endpoint 122 may respond to the query from the messaging agent 142 at the private cloud platform 140 by at least determining whether the message queue 126 includes messages for the cloud instance group "XYZ" that includes the private cloud platform 140 (460). The messages that are destined for the cloud instance group "XYZ" including the private cloud platform 140 may be retrieved from the message queue 126 and sent to the private cloud platform 140 via the web-based endpoint 122 (462).

Upon retrieving the messages retrieved from the message queue 126, the private cloud platform 140 may fulfill the configuration management task from the multi-cloud controller 110 (458). For example, the private cloud platform 140 may fulfill the configuration management task from the multi-cloud controller 110 by at least sending, to the multi-cloud controller 110, inventory data that the multi-cloud controller 110 may use to update a database (e.g., a configuration management database (CMDB)) associated with the multi-cloud controller 110 (464).

Figure 5:
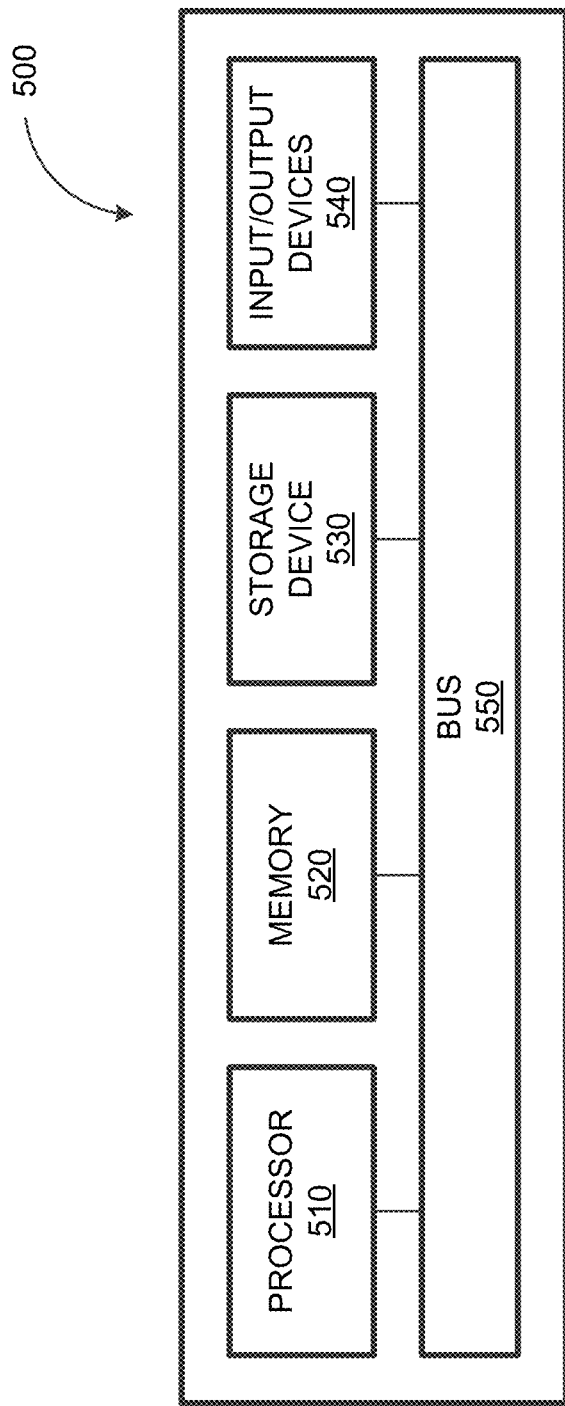
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1-3, 4A-B, and 5, the computing system 500 can be used to implement the multi-cloud controller 110, the public cloud platform 130, the private cloud platform 140, the messaging system 120, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the cloud platform 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include users and servers. A user and server are generally remote from each other and typically interact through a communication network. The relationship of user and server arises by virtue of computer programs running on the respective computers and having a user-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows can include different and/or additional operations than shown without departing from the scope of the present disclosure. One or more operations of the logic flows can be repeated and/or omitted without departing from the scope of the present disclosure. Other implementations can be within the scope of the following claims.

What is claimed is:

1. A system, comprising:
at least one data processor; and
at least one memory storing instructions which, when executed by the at least one data processor, result in operations comprising:
receiving, by a centralized messaging system, a first message from a multi-cloud controller, the first message received via a first messaging interface, the first message including instructions to control a first operation of the first cloud platform, wherein the centralized messaging system includes the first messaging interface to the multi-cloud controller, a second messaging interface to at least the first cloud platform of a multi-cloud computing environment, and a third messaging interface to at least a second cloud platform of the multi-cloud computing environment, wherein the multi-cloud computing environment comprises a hybrid cloud computing environment in which the first cloud platform comprises a private cloud platform and the second cloud platform comprises a public cloud platform;
in response to receiving the first message from the multi-cloud controller, depositing, by the centralized messaging system, the first message in a first message queue configured to hold only messages for the first cloud platform, wherein prior to depositing the first message in the first message queue, the centralized messaging system normalizes the first message to conform to a first native message format of the first cloud platform;
receiving, by the centralized messaging system, a first request, via the second messaging interface, to retrieve the first message destined for the first cloud platform;
in response to the first request, responding, by the centralized messaging system, to the first request by at least sending, via the second messaging interface to the first cloud platform, the first message from the first message queue;
receiving, by the centralized messaging system via the first messaging interface, a second message from the multi-cloud controller, the second message including instructions to control a second operation of the second cloud platform;
in response to receiving the second message from the multi-cloud controller, depositing, by the centralized messaging system, the second message in a second message queue configured to hold only messages for the second cloud platform, wherein prior to depositing the second message in the second message queue, the centralized messaging system normalizes the second message to conform to a second native message format of the second cloud platform, the second native message format different from the first native message format;
receiving, by the centralized messaging system via the third messaging interface, a second request to retrieve the second message destined for the second cloud platform; and
in response to the second request received from the multi-cloud controller via the third messaging interface, responding, by the centralized messaging system, to the second request by at least sending, via the third messaging interface to the second cloud platform, the second message from the second message queue.

2. The system of claim 1, wherein the first message is further normalized to include a cryptographic signature, and wherein the cryptographic signature is generated using a shared key held in a repository that is accessible to the multi-cloud controller and the first cloud platform.

3. The system of claim 1, wherein the first message is received as part of a payload of a first Hypertext Transfer Protocol (HTTP) request from the multi-cloud controller, and wherein the first request from the first cloud platform comprises a second Hypertext Transfer Protocol request.

4. The system of claim 1, wherein the first message queue holds data destined for the first cloud platform, wherein a second message queue holds data destined for the second cloud platform, wherein the first message is deposited in the first message queue for retrieval by the first cloud platform, and wherein the second message is deposited in the second message queue for retrieval by the second cloud platform.

5. A method, comprising:
receiving, by a centralized messaging system, a first message from a multi-cloud controller, the first message received via a first messaging interface, the first message including instructions to control a first operation of the first cloud platform, wherein the centralized messaging system includes the first messaging interface to the multi-cloud controller, a second messaging interface to at least the first cloud platform of a multi-cloud computing environment, and a third messaging interface to at least a second cloud platform of the multi-cloud computing environment, wherein the multi-cloud computing environment comprises a hybrid cloud computing environment in which the first cloud platform comprises a private cloud platform and the second cloud platform comprises a public cloud platform;
in response to receiving the first message from the multi-cloud controller, depositing, by the centralized messaging system, the first message in a first message queue configured to hold only messages for the first cloud platform, wherein prior to depositing the first message in the first message queue, the centralized messaging system normalizes the first message to conform to a first native message format of the first cloud platform;
receiving, by the centralized messaging system, a first request, via the second messaging interface, to retrieve the first message destined for the first cloud platform;
in response to the first request, responding, by the centralized messaging system, to the first request by at least sending, via the second messaging interface to the first cloud platform, the first message from the first message queue;
receiving, by the centralized messaging system via the first messaging interface, a second message from the multi-cloud controller, the second message including instructions to control a second operation of the second cloud platform;
in response to receiving the second message from the multi-cloud controller, depositing, by the centralized messaging system, the second message in a second message queue configured to hold only messages for the second cloud platform, wherein prior to depositing the second message in the second message queue, the centralized messaging system normalizes the second message to conform to a second native message format of the second cloud platform, the second native message format different from the first native message format;

receiving, by the centralized messaging system via the third messaging interface, a second request to retrieve the second message destined for the second cloud platform; and in response to the second request received from the multi-cloud controller via the third messaging interface, responding, by the centralized messaging system, to the second request by at least sending, via the third messaging interface to the second cloud platform, the second message from the second message queue.

6. The method of claim 5, wherein the first message is further normalized to include a cryptographic signature, and wherein the cryptographic signature is generated using a shared key held in a repository that is accessible to the multi-cloud controller and the first cloud platform.

7. The method of claim 5, wherein the first message queue holds data destined for the first cloud platform, wherein a second message queue holds data destined for the second cloud platform, wherein the first message is deposited in the first message queue for retrieval by the first cloud platform, and wherein the second message is deposited in the second message queue for retrieval by the second cloud platform.

8. A non-transitory computer-readable medium storing instructions, which when executed by at least one data processor, result in operations comprising:

receiving, by a centralized messaging system, a first message from a multi-cloud controller, the first message received via a first messaging interface, the first message including instructions to control a first operation of the first cloud platform, wherein the centralized messaging system includes the first messaging interface to the multi-cloud controller, a second messaging interface to at least the first cloud platform of a multi-cloud computing environment, and a third messaging interface to at least a second cloud platform of the multi-cloud computing environment, wherein the multi-cloud computing environment comprises a hybrid cloud computing environment in which the first cloud platform comprises a private cloud platform and the second cloud platform comprises a public cloud platform;

in response to receiving the first message from the multi-cloud controller, depositing, by the centralized messaging system, the first message in a first message queue configured to hold only messages for the first cloud platform, wherein prior to depositing the first message in the first message queue, the centralized messaging system normalizes the first message to conform to a first native message format of the first cloud platform;

receiving, by the centralized messaging system, a first request, via the second messaging interface, to retrieve the first message destined for the first cloud platform;

in response to the first request, responding, by the centralized messaging system, to the first request by at least sending, via the second messaging interface to the first cloud platform, the first message from the first message queue;

receiving, by the centralized messaging system via the first messaging interface, a second message from the multi-cloud controller, the second message including instructions to control a second operation of the second cloud platform;

in response to receiving the second message from the multi-cloud controller, depositing, by the centralized messaging system, the second message in a second message queue configured to hold only messages for the second cloud platform, wherein prior to depositing the second message in the second message queue, the centralized messaging system normalizes the second message to conform to a second native message format of the second cloud platform, the second native message format different from the first native message format;

receiving, by the centralized messaging system via the third messaging interface, a second request to retrieve the second message destined for the second cloud platform; and in response to the second request received from the multi-cloud controller via the third messaging interface, responding, by the centralized messaging system, to the second request by at least sending, via the third messaging interface to the second cloud platform, the second message from the second message queue.

* * * * *